(12) United States Patent
Roddy et al.

(10) Patent No.: US 7,335,252 B2
(45) Date of Patent: Feb. 26, 2008

(54) LIGHTWEIGHT SETTABLE COMPOSITIONS COMPRISING CEMENT KILN DUST

(75) Inventors: Craig W. Roddy, Duncan, OK (US); Jiten Chatterji, Duncan, OK (US); D. Chad Brenneis, Marlow, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/416,754

(22) Filed: May 3, 2006

(65) Prior Publication Data

US 2007/0056476 A1  Mar. 15, 2007

Related U.S. Application Data

(63) Continuation-in-part of application No. 11/223,671, filed on Sep. 9, 2005, now Pat. No. 7,077,203.

(51) Int. Cl.
*C04B 18/00* (2006.01)

(52) U.S. Cl. .............. 106/707; 106/716; 106/819

(58) Field of Classification Search .............. 106/707, 106/716, 819
See application file for complete search history.

(56) References Cited

U.S. PATENT DOCUMENTS

| | | | |
|---|---|---|---|
| 2,094,316 A | 9/1937 | Cross et al. | |
| 2,329,940 A | 9/1943 | Ponzer | |
| 2,842,205 A | 7/1958 | Allen et al. | |
| 2,871,133 A | 1/1959 | Palonen et al. | |
| 2,945,769 A | 7/1960 | Gama et al. | |
| 3,454,095 A | 7/1969 | Messenger et al. | |
| 3,748,159 A | 7/1973 | George | |
| 3,887,385 A | 6/1975 | Quist et al. | |
| 4,018,617 A | 4/1977 | Nicholson | |
| 4,031,184 A | 6/1977 | McCord | |
| 4,268,316 A | 5/1981 | Wills, Jr. | |
| 4,341,562 A | 7/1982 | Ahlbeck | |
| RE31,190 E | 3/1983 | Detroit et al. | |
| 4,407,677 A | 10/1983 | Wills, Jr. | |
| 4,432,800 A | 2/1984 | Kneller et al. | |
| 4,435,216 A | 3/1984 | Diehl et al. | |
| 4,460,292 A | 7/1984 | Durham et al. | |
| 4,494,990 A | 1/1985 | Harris | |
| 4,515,635 A | 5/1985 | Rao et al. | |
| 4,555,269 A | 11/1985 | Rao et al. | |
| 4,614,599 A | 9/1986 | Walker | |
| 4,624,711 A | 11/1986 | Styron | |
| 4,676,317 A | 6/1987 | Fry et al. | |
| 4,741,782 A | 5/1988 | Styron | |
| 4,784,223 A | 11/1988 | Worrall et al. | |
| 4,941,536 A | 7/1990 | Brothers et al. | |
| 4,992,102 A | 2/1991 | Barbour et al. | |
| 5,030,366 A | 7/1991 | Wilson et al. | 507/228 |
| 5,049,288 A | 9/1991 | Brothers et al. | |
| RE33,747 E | 11/1991 | Hartley et al. | |
| 5,086,850 A | 2/1992 | Harris et al. | |
| 5,121,795 A | 6/1992 | Ewert et al. | |
| 5,123,487 A | 6/1992 | Harris et al. | |
| 5,125,455 A | 6/1992 | Harris et al. | |
| 5,127,473 A | 7/1992 | Harris et al. | |
| 5,183,505 A | 2/1993 | Spinney | |
| 5,238,064 A | 8/1993 | Dahl et al. | |
| 5,266,111 A | 11/1993 | Barbour et al. | |
| 5,295,543 A | 3/1994 | Terry et al. | |
| 5,314,022 A | 5/1994 | Cowan et al. | |
| 5,327,968 A | 7/1994 | Onan et al. | |
| 5,337,824 A | 8/1994 | Cowan | |
| 5,352,288 A | 10/1994 | Mallow | |
| 5,358,044 A | 10/1994 | Hale et al. | |
| 5,368,103 A | 11/1994 | Heathman et al. | |
| 5,382,290 A | 1/1995 | Nahm et al. | |
| 5,383,521 A | 1/1995 | Onan et al. | |
| 5,383,967 A | 1/1995 | Chase | |
| 5,458,195 A | 10/1995 | Totten et al. | |
| 5,472,051 A | 12/1995 | Brothers | |
| 5,494,513 A | 2/1996 | Fu et al. | |
| 5,518,996 A | 5/1996 | Maroy et al. | |
| 5,520,730 A | 5/1996 | Barbour et al. | |

(Continued)

FOREIGN PATENT DOCUMENTS

| | | |
|---|---|---|
| CA | 2153372 | 9/1996 |
| EP | 1 348 831 | 10/2003 |
| GB | 1469954 | 4/1977 |
| JP | 52117316 A | 1/1977 |
| JP | 10110487 | 4/1998 |
| SU | 1373781 | 2/1988 |
| WO | WO 83/01443 | 4/1983 |
| WO | WO 98/54108 | 12/1998 |
| WO | WO 00/63134 | 10/2000 |
| WO | WO 03/031364 | 4/2003 |
| WO | WO 03/031364 A1 | 4/2003 |

OTHER PUBLICATIONS

Foreign communication related to a counterpart application dated Dec. 1, 2006.

(Continued)

*Primary Examiner*—Paul Marcantoni
(74) *Attorney, Agent, or Firm*—Craig W. Roddy; Baker Botts, LLP

(57) ABSTRACT

Settable compositions that comprise water, CKD, and microspheres, wherein the lightweight settable composition has a density less than about 13 pounds per gallon. Methods of cementing that comprise providing a lightweight settable composition having a density less than about 13 pounds per gallon, the lightweight settable composition comprising water, CKD, and microspheres, introducing the lightweight settable composition into a location to be cemented and allowing the lightweight settable composition to set therein.

20 Claims, No Drawings

U.S. PATENT DOCUMENTS

| | | |
|---|---|---|
| 5,529,624 A | 6/1996 | Riegler |
| 5,536,311 A | 7/1996 | Rodrigues |
| 5,569,324 A | 10/1996 | Totten et al. |
| 5,585,333 A | 12/1996 | Dahl et al. |
| 5,588,489 A | 12/1996 | Chatterji et al. |
| 5,711,383 A | 1/1998 | Terry et al. |
| 5,716,910 A | 2/1998 | Totten et al. |
| 5,728,654 A | 3/1998 | Dobson, Jr. et al. |
| 5,851,960 A | 12/1998 | Totten et al. |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,060,434 A | 5/2000 | Sweatman et al. |
| 6,060,535 A | 5/2000 | Villar et al. |
| 6,063,738 A | 5/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,277,189 B1 | 8/2001 | Chugh ........................ 106/705 |
| 6,312,515 B1 | 11/2001 | Barlet-Gouedard et al. |
| 6,315,042 B1 | 11/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,457,524 B1 | 10/2002 | Roddy |
| 6,478,869 B2 | 11/2002 | Reddy et al. |
| 6,488,763 B2 | 12/2002 | Brothers et al. |
| 6,494,951 B1 | 12/2002 | Reddy et al. |
| 6,500,252 B1 | 12/2002 | Chatterji et al. |
| 6,508,305 B1 | 1/2003 | Brannon et al. |
| 6,524,384 B2 | 2/2003 | Griffith et al. |
| 6,547,871 B2 | 4/2003 | Chatterji et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,610,139 B2 | 8/2003 | Reddy et al. |
| 6,626,243 B1 | 9/2003 | Boncan |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,835,243 B2 | 12/2004 | Brothers et al. |
| 6,837,316 B2 | 1/2005 | Reddy et al. |
| 6,846,357 B2 | 1/2005 | Reddy et al. |
| 6,848,519 B2 | 2/2005 | Reddy et al. |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,077,203 B1 | 7/2006 | Roddy et al. |
| 7,284,609 B2 | 10/2007 | Roddy et al. ............... 166/291 |
| 2002/0033121 A1 | 3/2002 | Marko |
| 2002/0073897 A1 | 6/2002 | Trato |
| 2002/0117090 A1 | 8/2002 | Ku |
| 2003/0116065 A1 | 6/2003 | Griffith et al. |
| 2003/0116887 A1 | 6/2003 | Scott |
| 2003/0167970 A1 | 9/2003 | Polston |
| 2004/0007162 A1 | 1/2004 | Morioka et al. |
| 2004/0040475 A1 | 3/2004 | De La Roij |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0118092 A1 | 6/2004 | Santra et al. |
| 2004/0187740 A1 | 9/2004 | Timmon |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0072599 A1 | 4/2005 | Luke et al. |
| 2005/0098317 A1 | 5/2005 | Reddy et al. |
| 2005/0133221 A1 | 6/2005 | Chatterji et al. |
| 2006/0025312 A1 | 2/2006 | Santra et al. |
| 2006/0166834 A1 | 7/2006 | Roddy ........................ 507/140 |
| 2007/0238621 A1 | 10/2007 | Roddy et al. ............... 507/140 |

OTHER PUBLICATIONS

Foreign communication related to a counterpart application dated Dec. 19, 2006.

Office action dated Jan. 17, 2007 from U.S. Appl. No. 11/223,703.

LaFarge North America Material Safety Data Sheet entitled "Cement Kiln Dust" dated Mar. 3, 2005.

LaFarge brochure entitled "TerraCem™" dated Aug. 2006.

LaFarge North America Material Safety Data Sheet entitled LaFarge Blended Cement (cement) dated Mar. 3, 2005.

Foreign communication from a related counterpart application dated Nov. 2, 2006.

Office action dated Oct. 19, 2006 from U.S. Appl. No. 11/402,741.

Office action from U.S. Appl. No. 11/271,431 dated May 17, 2006.

txi® Material Safety Data Sheet for Pressue-Seal, no date available.

Roddy, C. et al., "Cementing Compositions Comprising Cement Kiln Dust, Vitrified Shale, Zeolite, And/Or Amorphous Silica . . ." U.S. Appl. No. 11/484,951, filed Jul. 12, 2006.

Office action dated Jul. 11, 2006 from U.S. Appl. No. 11/271,431.

Office action dated Jul. 21, 2006 from U.S. Appl. No. 11/416,563.

Office action dated Jul. 24, 2006 from U.S. Appl. No. 11/403,032.

Office action dated Aug. 15, 2006 from U.S. Appl. No. 11/271,431.

Office action dated Aug. 21, 2006 from U.S. Appl. No. 11/440,627.

Roddy, C. et al., "Methods of Using Settable Compositions Comprising Cement Kiln Dust" U.S. Appl. No. 11/440,627 filed May 25, 2006.

Herndon, J. et al., "Setting Downhole Plugs: A State-of-the-Art" Petroleum Engineer International, Apr. 1978.

Halliburton brochure entitled "Halad®-23 Fluid-Loss Additive" dated 2000.

Halliburton brochure entitled "Halad®-344 Fluid Loss Additive" dated 1998.

Halliburton brochure entitled "Halad®-413 Fluid-Loss Additive" dated 1998.

Halliburton brochure entitled "HR®-4 Cement Retarder" dated 1999.

Halliburton brochure entitled "HR®-5 Cement Additive" dated 1998.

Halliburton brochure entitled "HR®-7 Cement Retarder" dated 1999.

Halliburton brochure entitled HR®-12 Cement Retarder dated 1999.
Halliburton brochure entitled HR®-15 Cement Retarder dated 1999.
Halliburton brochure entitled "HR®-25 Cement Retarder" dated 1999.
Halliburton brochure entitled "SCR-100 Cement Retarder" dated 1999.
Halliburton brochure entitled "SCR-100 Cement Retarder—A Valuable Time Saver" dated 1994.
Halliburton brochure entitled "SCR-500L™ High-Temperature Retarder" dated 2000.
Halliburton brochure entitled "AQF-2 Foaming Agent" dated 1999.
Halliburton brochure entitled "Howco-Suds Surfactant" dated 1999.
Halliburton brochure entitled "Pozmix® A Cement Additive" dated 1999.
Halliburton brochure entitled "Pozmix Cement & Pozmix 140" undated.
University of Maine, "Beneficial Use of Solid Waste in Maine" printed from the internet Apr. 14, 2005.
Smith, Dwight K., "Cementing" dated 1980, p. 38.
Parsons, R.L. et al., "Use of Cement Kiln Dust for the Stabilization of Soils" printed from the internet on Apr. 14, 2005.
Paper entitled "Kiln Dusts" printed from the internet on Apr. 14, 2005.
Paper entitled "Standards for the Management of Cement Kiln Dust Waste" printed from the internet Apr. 14, 2005.
Sersale, R. et al., "Portland-Zeolite-Cement For Minimizing Alkali-Aggregate Expansion" dated 1987.
Marfil,S.A. et al., "Zeolite Crystallization in Portland Cement Concrete Due to Alkali-Aggregate Reaction" dated 1993.
Janotka, I., "The Properties of Mortar Using Blends With Portland Cement Clinker, Zeolite Tuff and Gypsum" dated 1995.
Atkins, M. et al., "Zeolite P In Cements Its Potential For Immobilizing Toxic and Radioactive Waste Species" dated 1995.
Rogers, B.A. et al., "Designing a Remedial Acid Treatment for Gulf of Mexico Deepwater Turbidite Sands Containing Zeolite Cement" dated 1998.
Janotka, I. et al., "Effect of Bentonite and Zeolite on Durability of Cement Suspension under Sulfate Attack" dated 1998.
Naiqian, Feng et al., "Study on the suppression effect of natural zeolite on expansion of concrete due to alkali-aggregate reaction" dated 1998.
Chan, Sammy et al., "Comparative study of the inital surface absorption and chloride diffusion of high performance zeolite, silicia fume and PFA concretes" dated 1999.
Ding, Jian-Tong et al., "Extreme vertices design of concrete with combined mineral admixtures" dated 1999.
Poon, C.S. et al., "A study on the hydration of natural zeolite blended cement pastes" dated 1999.

Feng, N.-Q et al., "Zeolite ceramiste cellular concrete" dated 2000.
Bartlet-Gouedard, V. et al., "A Non-Conventional Way of Developing Cement Slurry for Geothermal Wells" dated 2001.
Smith, Dwight "Cementing" Society of Petroleum Engineers, pp. 14, 38.
Office action from U.S. Appl. No. 11/223,671 dated Dec. 15, 2005.
Office action from U.S. Appl. No. 11/271,431 dated Mar. 6, 2006.
Roddy, C. et al., "Methods of Using Settable Compositions Comprising Cement Kiln Dust" U.S. Appl. No. 11/223,671 filed Sep. 9, 2005.
Roddy, C. et al., "Methods of Using Foamed Settable Compositions Comprising Cement Kiln Dust" U.S. Appl. No. 11/223,485, filed Sep. 9, 2005.
Roddy, C. et al., "Foamed Settable Compositions Comprising Cement Kiln Dust," U.S. Appl. No. 11/223,703, filed Sep. 9, 2005.
Roddy, C. et al., "Methods of Using Settable Compositions Comprising Cement Kiln Dust and Additive(s)" U.S. Appl. No. 11/223,750, filed Sep. 9, 2005.
Roddy, C. et al., "Settable Compositions Comprising Cement Kiln Dust and Additive(s)" U.S. Appl. No. 11/223,669, filed Sep. 9, 2005.
Roddy, C. et al., "Methods of Using Cement Compositions Comprising High Alumina Cement and Cement Kiln Dust" U.S. Appl. No. 11/257,261, filed Oct. 24, 2005.
Roddy, C. et al., "Cement Compositions Comprising High Alumina Cement and Cement Kiln Dust" U.S. Appl. No. 11/256,824, filed Oct. 24, 2005.
Roddy, C. et al., "Methods of Using Settable Compositions Comprising Cement Kiln Dust" U.S. Appl. No. 11/271,690, filed Nov. 10, 2005.
Roddy, C. et al., "Settable Spotting Compositions Comprising Cement Kiln Dust" U.S. Appl. No. 11/271,431, filed Nov. 10, 2005.
Office action from U.S. Appl. No. 11/223,671 dated Mar. 31, 2006.
3M Scotchlite™ Glass Bubbles Floated Product Series Product Information brochure dated 1999.
Roddy, C. et al., "Methods of Using Lightweight Settable Compositions Comprising Cement Kiln Dust" U.S. Appl. No. 11/416,563, filed May 3, 2006.
Foreign communication from a related counterpart application dated Oct. 27, 2006.
Office action dated Feb. 2, 2007 from U.S. Appl. No. 11/402,741.
Office Action mailed Aug. 10, 2007, from U.S. Appl. No. 11/257,261
Office Action from U.S. Appl. No. 11/402,741.
Office Action from U.S. Appl. No. 11/223,669.
Office Action from U.S. Appl. No. 11/223,750.
Final Office Action from Appl. No. 11/402,741.
Notice of Allowance from Application No. 11/257,261.

LIGHTWEIGHT SETTABLE COMPOSITIONS COMPRISING CEMENT KILN DUST

CROSS REFERENCE TO RELATED APPLICATION

The present application is a continuation-in-part of U.S. patent application Ser. No. 11/223,671, filed on Sep. 9, 2005, now U.S. Pat. No. 7,077,203, titled "Methods of Using Settable Compositions Comprising Cement Kiln Dust," the disclosure of which is incorporated herein by reference in its entirety. The present application is related to U.S. patent application Ser. No. 11/416,563, filed on the same date herewith, titled "Methods of Using Lightweight Settable Compositions Comprising Cement Kiln Dust," the disclosure of which is incorporated herein by reference in its entirety.

BACKGROUND

The present invention relates to cementing operations and, more particularly, to lightweight settable compositions comprising water, cement kiln dust ("CKD"), and microspheres, and associated methods of use.

Settable compositions may be used in a variety of above ground (e.g., in the construction industry) and subterranean applications. As used herein, the term "settable composition" refers to any composition that over time will set to form a hardened mass. One example of a settable composition comprises hydraulic cement and water. Subterranean applications that may involve settable compositions include, but are not limited to, primary and remedial cementing. For example, settable compositions may be used in primary cementing operations whereby pipe strings, such as casing and liners, are cemented in well bores. In performing primary cementing, a settable composition may be pumped into an annular space between the subterranean formation and the pipe string disposed therein. The settable composition sets in the annular space, thereby forming an annular sheath of hardened cement (e.g., a cement sheath) that supports and positions the pipe string in the well bore and bonds the exterior surface of the pipe string to the walls of the well bore. Settable compositions also are used in remedial cementing operations such as plugging highly permeable zones or fractures in well bores, plugging cracks and holes in pipe strings, and the like.

In some instances, settable compositions utilized in subterranean operations may be lightweight, for example, to prevent excessive hydrostatic pressure from being exerted on subterranean formations penetrated by the well bore, whereby the formations may be unintentionally fractured or the hole may collapse. One type of lightweight settable composition is a foamed cement composition, e.g., a cement composition that comprises a surfactant and a gas. Additionally, lightweight additives (e.g., microspheres) also may be added to settable compositions to reduce the density thereof.

During the manufacture of cement, a waste material commonly referred to as "CKD" is generated. "CKD," as that term is used herein, refers to a partially calcined kiln feed which is typically removed from the gas stream and collected in a dust collector during the manufacture of cement. Usually, large quantities of CKD are collected in the production of cement that are commonly disposed of as waste. Disposal of the waste CKD can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, $CaO$, $MgO$, $SO_3$, $Na_2O$, and $K_2O$.

The present invention relates to cementing operations and, more particularly, to lightweight settable compositions comprising water, CKD, and microspheres, and associated methods of use.

An embodiment of the present invention provides a lightweight settable composition that comprises water, CKD, and microspheres, wherein the lightweight settable composition has a density of less than about 13 pounds per gallon.

Another embodiment of the present invention provides a lightweight settable composition that comprises water, CKD, microspheres, vitrified shale, and hydrated lime, wherein the lightweight settable composition has a density of less than about 13 pounds per gallon.

Another embodiment of the present invention provides a lightweight settable composition that comprises water, CKD, and microspheres comprising soda lime borosilicate glass, wherein the lightweight settable composition has a density of less than about 13 pounds per gallon.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, to lightweight settable compositions comprising water, CKD, and microspheres, and associated methods of use. The lightweight settable compositions of the present invention may be used in a variety of subterranean applications, including primary cementing, and remedial cementing. The lightweight settable compositions of the present invention also may be used in surface applications, for example, construction cementing.

In one embodiment, a lightweight settable composition of the present invention comprises water, CKD, and microspheres. The lightweight settable compositions of the present invention should have a density suitable for a particular application as desired by those of ordinary skill in the art, with the benefit of this disclosure. Lightweight settable compositions generally have a density of less than about 13 pounds per gallon ("ppg"). In some embodiments, the lightweight settable compositions of the present invention may have a density in the range of from about 4 ppg to about 13 ppg. In the some embodiments, the lightweight settable composition may be foamed to further reduce the density thereof, for example, in the range of from about 4 ppg to about 11 ppg.

The water used in the lightweight settable compositions of the present invention may include freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may adversely affect other components in the lightweight settable composition. In some embodiments, the water may be included in an amount sufficient to form a pumpable slurry. In some embodiments, the water may be included in the lightweight settable compositions of the present invention in an amount in the range of from about 20% to about 80% by weight of the lightweight settable composition. In some embodiments, the water may be included in an amount in the range of from about 30% to about 70% by weight of the lightweight settable composition.

The CKD should be included in the lightweight settable compositions in an amount sufficient to provide the desired compressive strength, density, and/or cost reduction. In some embodiments, the CKD may be present in the lightweight settable compositions of the present invention in an amount in the range of from about 0.01% to about 80% by weight of the lightweight settable composition. In some embodiments, the CKD may be present in the lightweight settable compositions of the present invention in an amount in the range of from about 2.5% to about 80% by weight of settable materials. In some embodiments, the CKD may be present in the lightweight settable compositions of the present invention in an amount in the range of from about 2.5% to about 60% by weight of the lightweight settable composition. In some embodiments, the CKD may be present in the lightweight settable compositions of the present invention in an amount in the range of from about 5% to about 50% by weight of the lightweight settable composition.

The microspheres used in the lightweight settable compositions of the present invention may be any microsphere suitable for use in subterranean applications to, inter alia, reduce the density of the settable composition. Suitable microspheres generally have a density of less than about 8.345 ppg (1.0 gram per cubic centimeter ("g/cc")). A variety of microspheres may be utilized in accordance with the present invention, including hollow, solid, and/or porous microspheres. Generally, the microspheres should have a crush strength greater than about 100 psi. Suitable microspheres may comprise a variety of materials, including, but not limited to, microspheres that comprise glass, soda lime borosilicate glass, fly ash, ceramic, polystyrene, other polymeric materials, and mixtures thereof. In some embodiments of the lightweight settable compositions of the present invention, the microspheres are hollow, glass microspheres. In some embodiments, the microspheres may comprise a crosslinked polymeric material, such as polystyrene crosslinked with divinyl benzene (e.g., plastic beads). The microspheres may be obtained from any suitable source. Examples of suitable fly ash microspheres are commercially available from Halliburton Energy Services, Inc., Duncan, Okla., under the tradename SPHERELITE™ microspheres. Suitable hollow, soda lime borosilicate glass microspheres include 3M™ SCOTCHLITE™ glass bubbles.

Generally, suitable microspheres have a size of less than about 150 microns. In some embodiments, the microspheres have a size in the range of from about 5 microns to about 150 microns, alternatively from about 20 microns to about 105 microns, and alternatively from about 15 microns to about 80 microns.

The microspheres should be included in the lightweight settable compositions in an amount sufficient to provide the desired density, for example, less than about 13 ppg of the lightweight settable composition. In some embodiments, the microspheres may be present in the lightweight settable compositions of the present invention in an amount in the range of from about 1% to about 30% by weight of the lightweight settable composition. In some embodiments, the microspheres may be present in the lightweight settable compositions of the present invention in an amount in the range of from about 3% to about 25% by weight of the lightweight settable composition. In other embodiments, the microspheres may be present in the lightweight settable compositions of the present invention in an amount in the range of from about 5% to about 20% by weight of the lightweight settable composition.

The lightweight settable compositions of the present invention may optionally comprise a hydraulic cement. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, *API Specification for Materials and Testing for Well Cements*, API Specification 10, Fifth Ed., Jul. 1, 1990.

Where present, the hydraulic cement generally may be included in the lightweight settable compositions in an amount sufficient to provide the desired compressive strength, density, and/or cost. In some embodiments, the hydraulic cement may be present in the lightweight settable compositions of the present invention in an amount up to about 75% by weight of the lightweight settable composition. In some embodiments, the hydraulic cement may be present in the lightweight settable compositions of the present invention in an amount up to about 70% by weight of the lightweight settable composition. In some embodiments, the hydraulic cement may be present in the lightweight settable compositions of the present invention in an amount in the range of from about 10% to about 70% by weight of the lightweight settable composition. In some embodiments, the hydraulic cement may be present in the lightweight settable compositions of the present invention in an amount in the range of from about 20% to about 65% by weight of the lightweight settable composition.

In some embodiments, a pozzolana cement that may be suitable for use comprises fly ash. "Fly ash," as that term is used herein, refers to the residue from the combustion of powdered or ground coal, wherein the fly ash carried by the flue gases may be recovered, for example, by electrostatic precipitation. A variety of fly ashes may be suitable, including fly ash classified as Class C and Class F fly ash according to American Petroleum Institute, *API Specification for Materials and Testing for Well Cements*, API Specification 10, Fifth Ed., Jul. 1, 1990. Class C fly ash comprises both silica and lime so that, when mixed with water, it sets to form a hardened mass. Class F fly ash generally does not contain sufficient lime, so an additional source of calcium ions is required for the Class F fly ash to form a settable composition with water. In some embodiments, lime may be mixed with Class F fly ash in an amount in the range of from about 15% to about 25% by weight of the fly ash. In some instances, the lime may be hydrated lime. Suitable examples of fly ash include, but are not limited to, POZMIX® A cement additive, commercially available from Halliburton Energy Services, Inc., Duncan, Okla.

Where present, the fly ash generally may be included in the lightweight settable compositions in an amount sufficient to provide the desired compressive strength, density, and/or cost. In some embodiments, the fly ash may be present in the lightweight settable compositions of the present invention in an amount in the range of from about 5% to about 40% by weight of the lightweight settable composition. In some embodiments, the fly ash may be present in the lightweight settable compositions of the present invention in an amount in the range of from about 7% to about 30% by weight of the lightweight settable composition.

In some embodiments, a slag cement that may be suitable for use may comprise slag. "Slag," as that term is used herein, refers to a granulated, blast furnace by-product formed in the production of cast iron and generally comprises the oxidized impurities found in iron ore. Slag generally does not contain sufficient basic material, so slag cement further may comprise a base to produce a settable composition that may react with water to set to form a hardened mass. Examples of suitable sources of bases include, but are not limited to, sodium hydroxide, sodium bicarbonate, sodium carbonate, lime, and combinations thereof.

Where present, the slag cement generally may be included in the lightweight settable compositions in an amount sufficient to provide the desired compressive strength, density, and/or cost. In some embodiments, the slag cement may be present in the lightweight settable compositions of the present invention in an amount up to about 60% by weight of the lightweight settable composition. In some embodiments, the slag cement may be present in the lightweight settable compositions of the present invention in an amount in the range of from about 5% to about 40% by weight of the lightweight settable composition.

In certain embodiments, the lightweight settable compositions of the present invention further may comprise metakaolin. Generally, metakaolin may be prepared by heating kaolin clay, for example, to temperatures in the range of from about 600° C. to about 800° C. In some embodiments, the metakaolin may be present in the lightweight settable compositions of the present invention in an amount in the range of from about 2.5% to about 40% by weight of the lightweight settable composition. In some embodiments, the metakaolin may be present in an amount in the range of from about 5% to about 30% by weight of the lightweight settable composition.

In certain embodiments, the lightweight settable compositions of the present invention further may comprise vitrified shale. Among other things, vitrified shale included in the lightweight settable compositions may react with excess lime to form a suitable cementing material, for example, calcium silicate hydrate. A variety of vitrified shales are suitable, including those comprising silicon, aluminum, calcium, and/or magnesium. Suitable examples of vitrified shale include, but are not limited to, PRESSUR-SEAL® FINE LCM material and PRESSUR-SEAL® COARSE LCM material, which are commercially available from TXI Energy Services, Inc., Houston, Tex. Generally, the vitrified shale may have any particle size distribution as desired for a particular application. In certain embodiments, the vitrified shale may have a particle size distribution in the range of from about 37 micrometers to about 4,750 micrometers.

Where present, the vitrified shale may be included in the lightweight settable compositions of the present invention in an amount sufficient to provide the desired compressive strength, density, and/or cost. In some embodiments, the vitrified shale and necessary amount of lime for setting may be present in an amount up to about 50% by weight of the lightweight settable composition. In some embodiments, the vitrified shale may be present in an amount in the range of from about 5% to about 30% by weight of the lightweight settable composition. One of ordinary skill in the art, with the benefit of this disclosure, will recognize the appropriate amount of the vitrified shale to include for a chosen application.

In certain embodiments, the lightweight settable compositions of the present invention further may comprise zeolite. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. An example of a suitable source of zeolite is available from the C2C Zeolite Corporation of Calgary, Canada. In some embodiments, the zeolite may be present in the lightweight settable compositions of the present invention in an amount in the range of from about 2.5% to about 2.5% by weight of the lightweight settable composition.

In certain embodiments, the lightweight settable compositions of the present invention further may comprise a set retarding additive. Examples of suitable set retarding additives include, but are not limited to, ammonium, alkali metals, alkaline earth metals, metal salts of sulfoalkylated lignins, hydroxycarboxy acids, copolymers that comprise acrylic acid or maleic acid, and combinations thereof. One example of a suitable sulfoalkylate lignin comprises a sulfomethylated lignin. Suitable set retarding additives are disclosed in more detail in U.S. Pat. No. Re. 31,190, the entire disclosure of which is incorporated herein by reference. Suitable set retarding additives are commercially available from Halliburton Energy Services, Inc. under the tradenames HR® 4, HR® 5, HR® 7, HR® 12, HR® 15, HR® 25, SCR™ 100, and SCR™ 500. Generally, where used, the set retarding additive may be included in the lightweight settable compositions of the present invention in an amount sufficient to provide the desired set retardation. In some embodiments, the set retarding additive may be present in an amount in the range of from about 0.02% to about 2.5% by weight of the lightweight settable composition.

Optionally, other additional additives may be added to the lightweight settable compositions of the present invention as deemed appropriate by one skilled in the art, with the benefit of this disclosure. Examples of such additives include, but are not limited to, accelerators, lost circulation materials, filtration control additives, dispersants, and combinations thereof. Suitable examples of these additives include crystalline silica compounds, amorphous silica, salts, fibers, calcined clays, combinations thereof and the like.

In certain embodiments, the lightweight settable compositions of the present invention may be foamed with a gas. These foamed embodiments may comprise water, CKD, microspheres, a gas, and a surfactant. Other suitable additives, such as those discussed previously, also may be included in the foamed lightweight settable compositions of the present invention as desired by those of ordinary skill in the art, with the benefit of this disclosure. The gas used in the foamed lightweight settable compositions of the present invention may be any gas suitable for foaming a settable composition, including, but not limited to, air, nitrogen, or combinations thereof. Generally, the gas should be present in the foamed lightweight settable compositions of the present invention in an amount sufficient to form the desired foam. In certain embodiments, the gas may be present in the foamed lightweight settable compositions of the present invention in an amount in the range of from about 10% to about 80% by volume of the composition.

Generally, the surfactant may be present in the foamed lightweight settable compositions of the present invention in an amount sufficient to provide a suitable foam. In some embodiments, the surfactant may be present in an amount in the range of from about 0.5% and about 5% by volume of the water ("bvow").

The lightweight settable compositions of the present invention may be used in a variety of subterranean applications, including, but not limited to, primary cementing, and remedial cementing. The lightweight settable compositions of the present invention also may be used in surface applications, for example, construction cementing.

An example of a method of the present invention comprises providing a lightweight settable composition of the present invention having a density of less than about 13 ppg, the lightweight settable composition comprising water, CKD, and microspheres, placing the lightweight settable composition in a location to be cemented, and allowing the lightweight settable composition to set therein. In some embodiments, the location to be cemented may be above ground, for example, in construction cementing. In some embodiments, the location to be cemented may be in a subterranean formation, for example, in subterranean applications. As desired by one of ordinary skill in the art, with the benefit of this disclosure, the lightweight settable compositions of the present invention useful in this method further may comprise any of the above-listed additives, as well any of a variety of other additives suitable for use in subterranean applications.

Another example of a method of the present invention is a method of primary cementing. An example of such a method may comprise providing a lightweight settable composition of the present invention having a density of less than about 13 ppg, the lightweight settable composition comprising water, CKD, and microspheres; introducing the lightweight settable composition into an annulus between a subterranean formation and a pipe string located in the subterranean formation; and allowing the lightweight settable composition to set in the annulus. Generally, in most instances, the lightweight settable composition should set into hardened mass that fixes the pipe string to the subterranean formation. As desired by one of ordinary skill in the art, with the benefit of this disclosure, the lightweight settable compositions of the present invention useful in this method further may comprise any of the above-listed additives, as well any of a variety of other additives suitable for use in subterranean application.

To facilitate a better understanding of the present invention, the following examples of certain aspects of some embodiments are given. In no way should the following examples be read to limit, or define, the scope of the invention.

EXAMPLE 1

A series of sample settable compositions were prepared at room temperature and subjected to 96-hour compressive strength tests at 120° F. in accordance with API Specification 10. The sample compositions comprised microspheres (3M™ SCOTCHLITE™ glass bubbles), and Class C Portland cement or Class A CKD in the amounts indicated in the table below. Sample No. 1 additionally comprised water (200% bwoc), SILICALITE™ cement additive (17.8% bwoc), CAL-SEAL® calcined gypsum plaster (8.9% bwoc), and MICRO MATRIX® cement (17.8% bwoc). Sample No. 2 additionally comprised water (257.14% bwoc), SILICALITE™ cement additive (28.6% bwoc), CAL-SEAL® calcined gypsum plaster (17.1% bwoc), and MICRO MATRIX® cement (28.6% bwoc). In these examples, "bwoc" refers to by weight of cement, wherein the cement is the Portland cement and/or CKD included in the sample composition. SILICALITE™ cement additive is an amorphous silica powder commercially available from Halliburton Energy Services, Inc. CAL-SEAL CAL-SEAL® calcined gypsum plaster is commercially available from U.S. Gypsum Company. MICRO MATRIX® cement is a fine hydraulic cement, commercially available from Halliburton Energy Services, Inc.

The results of the compressive strength tests are set forth in the table below.

TABLE 1

Compressive Strength Tests

| Sample | Density (ppg) | Portland Cement Class C (% bwoc) | CKD Class A (% bwoc) | SCOTCHLITE™ Glass Bubbles K25[1] (% bwoc) | SCOTCHLITE™ Glass Bubbles S32[2] (% bwoc) | 96-Hour Compressive Strength at 120° F. (psi) |
|---|---|---|---|---|---|---|
| No. 1 | 7.6 | 100 | 0 | 20 | 35.5 | 822 |
| No. 2 | 7.67 | 0 | 100 | 22.9 | 40 | 509 |

[1]3M™ SCOTCHLITE™ glass bubbles K25 have a density of about 2.086 ppg (0.25 g/cc).
[2]3M™ SCOTCHLITE™ Glass Bubbles S32 have a density of about 2.671 ppg (0.32 g/cc).

EXAMPLE 2

A series of sample settable compositions were prepared at room temperature and subjected to 24-hour compressive strength tests at 100° F. in accordance with API Specification 10. The sample compositions comprised microspheres (3M™ SCOTCHLITE™ glass bubbles), Class C Portland cement, and Class A CKD in the amounts indicated in Table 2 below. Each of the sample compositions also comprised water (180% bwoc), SILICALITE™ cement additive (8% bwoc), CAL-SEAL® calcined gypsum plaster (4% bwoc), and MICRO MATRIX® cement (12% bwoc).

The results of the compressive strength tests are set forth in the table below:

TABLE 2

Compressive Strength Tests

| Sample | Density (ppg) | Portland Cement Class C (% bwoc) | CKD Class A (% bwoc) | SCOTCHLITE™ Glass Bubbles K25 (% bwoc) | SCOTCHLITE™ Glass Bubbles S32 (% bwoc) | 24-Hour Compressive Strength at 100° F. (psi) |
|---|---|---|---|---|---|---|
| No. 3 | 7.53 | 100 | 0 | 18 | 32 | 137 |
| No. 4 | 7.50 | 70 | 30 | 18 | 32 | 136.5 |
| No. 5 | 7.49 | 60 | 40 | 18 | 32 | 102 |

EXAMPLE 3

A series of sample settable compositions were prepared at room temperature and subjected to 24-hour compressive strength tests at 100° F. and 140° F. in accordance with API Specification 10. The sample compositions comprised microspheres (3M™ SCOTCHLITE™ glass bubbles), Class G CKD, and Class G Portland cement in the amounts indicated in the table below. Each of the sample compositions also comprised water (86.47% bwoc), SILICALITE™ cement additive (4% bwoc), CAL-SEAL® calcined gypsum plaster (2% bwoc), and MICRO MATRIX® cement (6% bwoc).

The results of the compressive strength tests are set forth in the table below.

TABLE 3

Compressive Strength Tests

| Sample | Density (ppg) | Cement Class G (% bwoc) | CKD Class G (% bwoc) | SCOTCHLITE™ Bead K25 (% bwoc) | 24-Hour Compressive Strength at 100° F. (psi) | 24-Hour Compressive Strength at 140° F. (psi) |
|---|---|---|---|---|---|---|
| No. 6 | 7.50 | 100 | 0 | 20 | 150 | 250 |
| No. 7 | 7.50 | 70 | 30 | 20 | 85 | 238 |
| No. 8 | 7.50 | 0 | 100 | 20 | 19 | 115 |

EXAMPLE 4

A series of sample settable compositions were prepared at room temperature and subjected to 96-hour compressive strength tests at 140° F. and 160° F. in accordance with API Specification 10. The sample compositions comprised microspheres (3M™ SCOTCHLITE™ glass bubbles) and Class H CKD. Each of the sample compositions also comprised water, hydrated lime, vitrified shale (PRESSUR-SEAL® FINE LCM material), and CFR™-3 cement dispersant. CFR™-3 cement dispersant is commercially available from Halliburton Energy Services, Inc.

The results of the compressive strength tests are set forth in the table below.

TABLE 4

Compressive Strength Tests

| Sample | Density (ppg) | CKD Class H (% bwoc) | Water (% bwoc) | Hydrated Lime (% bwoc) | Pressure Seal (% bwoc) | CFR-3 (% bwoc) | SCOTCHLITE™ Glass Bubbles S32 (% bwoc) | 96-Hour Compressive Strength at 140° F. (psi) | 96-Hour Compressive Strength at 160° F. (psi) |
|---|---|---|---|---|---|---|---|---|---|
| No. 9 | 7.96 | 100 | 228.6 | 19 | 100 | 0 | 76.2 | 502 | 543 |
| No. 10 | 8.01 | 100 | 228.6 | 9.5 | 0 | 0.28 | 38.1 | 305 | 323 |
| No. 11 | 8.85 | 100 | 80 | 0 | 0 | 0.75 | 25 | 407 | 483 |

Accordingly, Examples 1-4 indicate that settable compositions comprising hydraulic cement, CKD, and microspheres may have suitable compressive strengths for a particular application.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A lightweight settable composition comprising water, cement kiln dust, and microspheres, wherein the lightweight settable composition has a density less than about 13 pounds per gallon.

2. The lightweight settable composition of claim 1 wherein the cement kiln dust is present in the lightweight settable composition in an amount in the range of from about 0.01% to about 80% by weight of the lightweight settable composition.

3. The lightweight settable composition of claim 1 wherein the microspheres are present in the lightweight settable composition in an amount in the range of from about 1% to 30% by weight of the lightweight settable composition.

4. The lightweight settable composition of claim 1 wherein the microspheres have a size less than about 150 microns.

5. The lightweight settable composition of claim 1 wherein the microspheres comprise at least one microsphere selected from the group consisting of hollow microspheres, solid microspheres, porous microspheres, and combinations thereof.

6. The lightweight settable composition of claim 1 wherein the microspheres comprise a material selected from the group consisting of glass, fly ash, ceramic, polystyrene, other polymeric materials, and combinations thereof.

7. The lightweight settable composition of claim 1 wherein the microspheres comprise sodium lime borosilicate glass.

8. The lightweight settable composition of claim 1 wherein the microspheres comprise polystyrene crosslinked with divinyl benzene.

9. The lightweight settable composition of claim 1 wherein the microspheres have a crush strength of greater than about 100 psi.

10. The lightweight settable composition of claim 1 wherein the microspheres have a density of less than about 8.345 pounds per gallon.

11. The lightweight settable composition of claim 1 wherein the lightweight settable composition further comprises a hydraulic cement.

12. The lightweight settable composition of claim 1 wherein the lightweight settable composition further comprises an additive selected from the group consisting of fly ash, vitrified shale, zeolite, hydrated lime, slag cement, metakaolin, and combinations thereof.

13. The lightweight settable composition of claim 1 wherein the lightweight settable composition further comprises an additive selected from the group consisting of a set retarding additive, an accelerator, a lost circulation material, a filtration control additive, a dispersant, a gas, a foam stabilizing surfactant, and combinations thereof.

14. The lightweight settable composition of claim 1:
wherein the cement kiln dust is present in the lightweight settable composition in an amount in the range of from about 2.5% to about 60% by weight of the lightweight settable composition;
wherein the microspheres are present in the lightweight settable composition in an amount in the range of from about 1% to 30% by weight of the lightweight settable composition; and
wherein the lightweight settable composition further comprises Portland cement in an amount in the range of from about 20% to about 65% by weight of the lightweight settable composition.

15. A lightweight settable composition comprising water, cement kiln dust, microspheres, vitrified shale, and hydrated lime, wherein the lightweight settable composition has a density less than about 13 pounds per gallon.

16. The lightweight settable composition of claim 15 wherein the microspheres comprise at least one microsphere selected from the group consisting of hollow microspheres, solid microspheres, porous microspheres, and combinations thereof.

17. The lightweight settable composition of claim 15 wherein the microspheres comprise a material selected from the group consisting of glass, fly ash, ceramic, polystyrene, other polymeric materials, and combinations thereof.

18. A lightweight settable composition comprising water, cement kiln dust, and microspheres comprising soda lime borosilicate glass, wherein the lightweight settable composition has a density less than about 13 pounds per gallon.

19. The lightweight settable composition of claim 18 wherein the microspheres comprise at least one microsphere selected from the group consisting of hollow microspheres, solid microspheres, porous microspheres, and combinations thereof.

20. The lightweight settable composition of claim 18 wherein the microspheres comprise a material selected from the group consisting of glass, fly ash, ceramic, polystyrene, other polymeric materials, and combinations thereof.

* * * * *